United States Patent
Bettineski et al.

(10) Patent No.: US 9,098,217 B2
(45) Date of Patent: Aug. 4, 2015

(54) CAUSING AN ACTION TO OCCUR IN RESPONSE TO SCANNED DATA

(71) Applicant: Hewlett-Packard Development Company, L.P., Houston, TX (US)

(72) Inventors: Dave Bettineski, Vancouver, WA (US); Jon Karl Lewis, Vancouver, WA (US); Jonathan Newman, Vancouver, WA (US); Diane R Hammerstad, Corvallis, OR (US); Larry D King, Corvallis, OR (US); Jon Brewster, Corvallis, OR (US)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 25 days.

(21) Appl. No.: 13/849,381

(22) Filed: Mar. 22, 2013

(65) Prior Publication Data
US 2014/0285838 A1    Sep. 25, 2014

(51) Int. Cl.
G06F 3/12 (2006.01)
G06F 17/30 (2006.01)
H04N 1/00 (2006.01)
G06K 15/00 (2006.01)

(52) U.S. Cl.
CPC ............ *G06F 3/1204* (2013.01); *G06F 3/1265* (2013.01); *G06F 3/1288* (2013.01); *G06F 17/30879* (2013.01); *H04N 1/00127* (2013.01)

(58) Field of Classification Search
CPC ... G06Q 20/02; G06Q 40/02; G06K 9/00442; G06K 15/02; G06K 15/00; H04N 1/00225; H04N 1/00244; H04N 1/387; H04N 2201/0039; H04N 2201/0082

USPC ...................... 358/1.1, 1.13, 1.14, 1.15, 1.18; 382/100, 306, 505; 707/736; 709/202, 709/203, 225; 714/4.1
See application file for complete search history.

(56) References Cited

U.S. PATENT DOCUMENTS

| | | | |
|---|---|---|---|
| 4,893,333 | A | 1/1990 | Baran et al. |
| 5,418,865 | A | 5/1995 | Bloomberg |
| 5,867,633 | A | 2/1999 | Taylor, III et al. |
| 6,278,483 | B1 | 8/2001 | Sartor |
| 6,535,298 | B2 | 3/2003 | Winter et al. |

(Continued)

FOREIGN PATENT DOCUMENTS

| | | |
|---|---|---|
| EP | 1404102 | 3/2004 |
| GB | 2410823 B | 8/2007 |

(Continued)

OTHER PUBLICATIONS

EMC Captiva Cloud Toolkit Transforms Web-based Scanning; Achieves Strong Third-party Adoption; http://www.emc.com/about/news/press/2012120120726-01;htm; Jul. 26, 2012.

(Continued)

*Primary Examiner* — Gabriel Garcia
(74) *Attorney, Agent, or Firm* — Hewlett-Packard Patent Development

(57) ABSTRACT

Example embodiments relate to processing a scanned form by causing an action to occur. The scanned form includes a unique identifier that indicates that the action is to occur when the form is scanned. The unique identifier is detected in the scanned form data. The scanned form data may be transmitted to a server to use the unique identifier to identify the action to execute for processing the scanned data.

15 Claims, 6 Drawing Sheets

(56) References Cited

U.S. PATENT DOCUMENTS

| | | | |
|---|---|---|---|
| 6,742,708 B2 | 6/2004 | Shaked et al. | |
| 6,744,529 B2 | 6/2004 | Winter et al. | |
| 6,798,925 B1 | 9/2004 | Wagman | |
| 6,909,805 B2 | 6/2005 | Ma et al. | |
| 6,950,982 B1 | 9/2005 | Dourish | |
| 6,952,803 B1 | 10/2005 | Bloomberg et al. | |
| 6,956,671 B2 | 10/2005 | Monty et al. | |
| 7,142,318 B2 | 11/2006 | Lopez et al. | |
| 7,181,089 B2 | 2/2007 | Esaki et al. | |
| 7,202,861 B2 | 4/2007 | Lynggaard | |
| 7,233,913 B2 | 6/2007 | Scroggie et al. | |
| 7,293,697 B2 | 11/2007 | Wiebe et al. | |
| 7,315,391 B2 | 1/2008 | Nakano et al. | |
| 7,489,415 B2 | 2/2009 | Furuta et al. | |
| 7,525,675 B2 | 4/2009 | Shelton et al. | |
| 7,573,598 B2 | 8/2009 | Cragun et al. | |
| 7,650,568 B2 | 1/2010 | Williamson et al. | |
| 7,878,617 B2 | 2/2011 | Mizes et al. | |
| 8,049,910 B2 | 11/2011 | Beckman et al. | |
| 8,115,948 B2 | 2/2012 | Rosenfeld et al. | |
| 8,228,527 B2 | 7/2012 | Winter et al. | |
| 8,233,751 B2 * | 7/2012 | Patel et al. | 382/306 |
| 8,346,023 B2 | 1/2013 | Lin | |
| 2001/0010730 A1 | 8/2001 | Rhoads | |
| 2001/0019416 A1 | 9/2001 | Monty et al. | |
| 2001/0040685 A1 | 11/2001 | Winter et al. | |
| 2002/0033965 A1 | 3/2002 | Winter et al. | |
| 2002/0051201 A1 | 5/2002 | Winter et al. | |
| 2002/0138476 A1 | 9/2002 | Suwa et al. | |
| 2002/0186404 A1 | 12/2002 | Gragg | |
| 2003/0020945 A1 | 1/2003 | Lopez et al. | |
| 2003/0167203 A1 | 9/2003 | Thorne et al. | |
| 2004/0047001 A1 | 3/2004 | Gehring et al. | |
| 2004/0145770 A1 | 7/2004 | Nakano et al. | |
| 2004/0150845 A1 | 8/2004 | Brouhon | |
| 2004/0151399 A1 | 8/2004 | Skurdal et al. | |
| 2004/0205538 A1 | 10/2004 | Banerjee et al. | |
| 2005/0071738 A1 | 3/2005 | Park | |
| 2005/0114772 A1 | 5/2005 | Talley et al. | |
| 2005/0185204 A1 | 8/2005 | Shelton et al. | |
| 2005/0195447 A1 | 9/2005 | Os | |
| 2005/0231746 A1 | 10/2005 | Parry et al. | |
| 2006/0218496 A1 | 9/2006 | Kunori | |
| 2006/0224950 A1 | 10/2006 | Takaai | |
| 2006/0229940 A1 | 10/2006 | Grossman | |
| 2006/0294450 A1 | 12/2006 | Barrus et al. | |
| 2007/0147680 A1 | 6/2007 | Lundberg | |
| 2007/0188793 A1 | 8/2007 | Wakai | |
| 2008/0018591 A1 | 1/2008 | Pittel et al. | |
| 2008/0273797 A1 | 11/2008 | Takikawa et al. | |
| 2008/0309988 A1 | 12/2008 | Johnson et al. | |
| 2009/0128865 A1 | 5/2009 | Kuchibhotla et al. | |
| 2009/0232398 A1 | 9/2009 | Martin et al. | |
| 2009/0251338 A1 | 10/2009 | Marggraff et al. | |
| 2010/0027896 A1 | 2/2010 | Geva et al. | |
| 2010/0057573 A1 | 3/2010 | Singhal | |
| 2010/0182631 A1 * | 7/2010 | King et al. | 358/1.15 |
| 2010/0309527 A1 | 12/2010 | Mandalapu et al. | |
| 2010/0318407 A1 | 12/2010 | Leff et al. | |
| 2011/0080608 A1 | 4/2011 | Do et al. | |
| 2011/0235128 A1 | 9/2011 | Sisco | |
| 2011/0276383 A1 | 11/2011 | Heiser, II et al. | |
| 2012/0026081 A1 | 2/2012 | Kompalli et al. | |
| 2012/0050790 A1 * | 3/2012 | Hong | 358/1.15 |
| 2012/0050818 A1 | 3/2012 | Watanabe | |
| 2012/0079409 A1 * | 3/2012 | Luo et al. | 715/772 |
| 2012/0266219 A1 | 10/2012 | Coleman et al. | |
| 2012/0275708 A1 | 11/2012 | Fritz et al. | |
| 2013/0226700 A1 | 8/2013 | Lewis et al. | |
| 2013/0290326 A1 * | 10/2013 | Lebedev | 707/736 |

FOREIGN PATENT DOCUMENTS

| | | |
|---|---|---|
| JP | 2002305701 A | 10/2002 |
| JP | 2003162383 A | 6/2003 |
| JP | 2005236983 A | 9/2005 |
| JP | 2006001287 A | 1/2006 |
| WO | WO-2010140983 | 12/2010 |

OTHER PUBLICATIONS

CouponTrunk, "Discount Gifts & Flowers Shopping with a Gift Personalized Coupons for 2011," Personalized Gifts Galore, Nov. 5, 2011, see below . . . http://web.archive.org/web/20111105064140/http://www.coupontrunk.com/coupon-code/ . . . .

http://www.ritescript.com/Manuals/ritePenManual30.aspx#Macros.

Microsoft Developer Network, "Clipboard Formats," Sep. 9, 2010, see below . . . http://web.archieve.org/web/20100909220445/http://msdn.microsoft.com/en-us/library/ms649013(VS.85).aspx.

Mint.com, "Our Product," May 22, 2010, <http://web.archive.org/web/20100522215052/http://www.mint.com/product/>.

Nuance Community, Nuance Communications, Inc.; http://community.nuance.com/wikis/omnipage/workflows.aspx.

\* cited by examiner

| UNIQUE IDENTIFIER | ACTION TO EXECUTE |
|---|---|
| A | SEND USER-SELECTED ITEMS ON FORM TO PRINTER |
| B | ADD/UPDATE PERSONAL OR DEMOGRAPHIC INFORMATION |
| C | SEND EMAIL/TEXT |
| D | CONFIGURE COMPUTING DEVICE |
| E | TRANSMIT SCANNED DATA TO SERVICE |
| F | DIAL AUTOMATED PHONE CALL |
| G | CALCULATE TEST SCORE |
| H | PRINT USER-SPECIFIC DOCUMENT/ ANSWER SHEET |
| I | RECORD FORM AS RECEIVED |
| J | STORE FORM DATA |
| K | SUBSCRIBE USER TO A SERVICE |

*FIG. 7*

CAUSING AN ACTION TO OCCUR IN RESPONSE TO SCANNED DATA

BACKGROUND

Computing devices commonly communicate with servers over a network to provide users with a wide range of information and options for performing different tasks. A user may be required to manually locate, launch and navigate a number of different applications to access the desired information or perform a particular task. In many cases, the user may be required to download and print out a variety of different documents and forms before the information may be obtained or before the task may be executed.

BRIEF DESCRIPTION OF THE DRAWINGS

The following detailed description references the drawings, wherein:

FIG. 7 illustrates example database entries that associate a unique identifier on a form with a corresponding action to be executed when the form is scanned.

DETAILED DESCRIPTION

Figure 1:
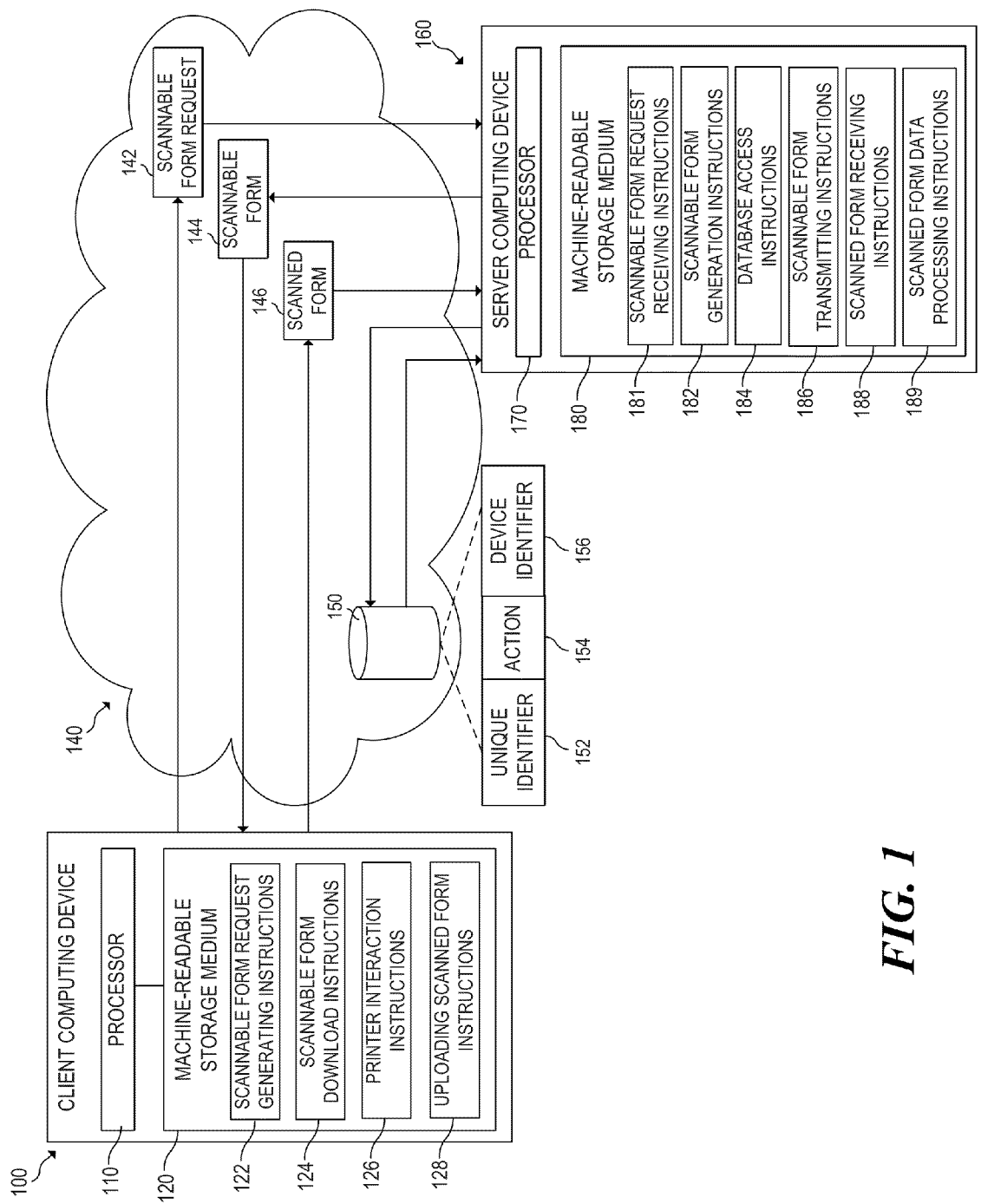
FIG. 1 is a block diagram of an example server computing device in communication with a client computing device for processing scanned data of the client computing device.

An application may allow a user to print out a page, select specific items on the page, and then scan the page for processing based on the user's selections. For example, a user may print out a page from an on-line coupon catalog, select specific coupons, and then scan the page back for processing by the application such that the coupons may be delivered to the user. Since the application includes code to allow the page to be scanned-back with the user-provided information, the user may have to locate and launch a specific application and then navigate to a specific feature of the application before the scanned data may be processed. Such requirements complicate the user's computing experience.

Example embodiments disclosed herein address these issues by processing scanned data for a specific application without a user having to know, identify, launch or navigate the application. The user may simply scan-back a page to cause potentially multiple actions to occur. Accordingly, the user experience is simplified.

In this manner, example embodiments disclosed herein provide a unique identifier on a scannable form that indicates that a particular action or set of actions is to occur when the form is subsequently scanned. A client computing device, such as a scanner, a multi-function printer with scanning capabilities or a camera, receives the form as scanned input. Existing scan functionality of the client computing device may be expanded to detect the unique identifier on the scanned form. Alternatively, a copy of the form may be accessible by a server from storage such that when the scanned form is received at the server from the client computing device, the server may access the copy of the form in storage and decode the unique identifier. The unique identifier indicates that the form has been scanned-back such that an action or group of actions associated with the unique identifier is caused to occur to process the scanned data.

In the event that the unique identifier is detected at the client computing device, a user may be prompted to select whether to move forward with a normal scan or to invoke scan-back processing. If the user selects scan-back processing, the scanned form data may be transmitted over a network to a server that provides the scan-back processing. The server accesses a database using the unique identifier to identify subsequent steps for processing the scanned data. The subsequent processing steps may cause a specific application to be launched on the device with which the user may interact. In some cases, no further interaction with the device may be needed, as the scanned data may contain everything necessary to complete the processing of the scanned data.

In one illustrative example, a user may sign up for a catalog service such that a coupon page is scheduled to be printed once a week. The user may provide personal information and/or demographic information on the catalog page. The catalog page may also contain shapes, such as bubbles, that may be filled-in by the user to select specific coupons. Instead of having to launch and navigate a coupon application, the user simply places the page with the provided information and the selected content on the glass of a printer and activates the printer's scanning function. The printer detects on the page a unique identifier which indicates that the page has been scanned-back. The printer may send the scanned data to a server that provides the scan-back service by accessing a database using the unique identifier to determine an action to be taken on the scanned data. The server may identify the catalog service from the database and forward the scanned data to the catalog service. The catalog service may then provide the appropriate data (e.g., coupon data) to the printer for printing the user-selected coupons.

With this approach, the user may not need to know the specific application for processing the scanned data, launch the application, or navigate within the application in order to invoke appropriate scanning functionality. Rather, the user may simply scan the document. This greatly simplifies the user experience especially if the page was printed automatically without the application or if the application is no longer open on the device when the user is ready to have the scanned data processed. In some cases, the application may be situated at a location other than the device. The process is further simplified because individual applications may avoid being customized to implement any additional code for providing the scanned data to a specific application. Furthermore, the scanned page may omit detailed instructions for how to install and launch the specific application and invoke the scan, thereby promoting efficient use of space on the page.

Referring now to the drawings, FIG. 1 is a block diagram of an example server computing device 160 in communication via a network 140 with a client computing device 100. As illustrated in FIG. 1 and described below, server computing device 160 may communicate with client computing device 100 to generate a scannable form, and process data on a scanned version of the form by executing an action associated with a unique identifier provided on the form.

Server computing device 160 may be any computing device accessible to a client device, such as client computing device 100, over network 140. Example networks include the Internet, a local area network (LAN), and a wide area network (WAN). In the embodiment of FIG. 1, server computing device 160 includes a processor 170 and a machine-readable storage medium 180.

Processor 170 may be one or more central processing units (CPUs), microprocessors, and/or other hardware devices suitable for retrieval and execution of instructions stored in machine-readable storage medium 180. Processor 170 may fetch, decode, and execute instructions 181, 182, 184, 186, 188, 189 to generate a scannable form and process a scanned version of the form, as described below. As an alternative or in addition to retrieving and executing instructions, processor 170 may include one or more electronic circuits comprising a number of electronic components for performing the functionality of one or more of instructions 181, 182, 184, 186, 188, 189.

Machine-readable storage medium 180 may be any electronic, magnetic, optical, or other physical storage device that stores executable instructions. Thus, machine-readable storage medium 180 may be, for example, Random Access Memory (RAM), an Electrically-Erasable Programmable Read-Only Memory (EEPROM), a storage drive, an optical disc, and the like. As described in detail below, machine-readable storage medium 180 may be encoded with executable instructions for generating a scannable form and processing a scanned version of the form.

Client computing device 100 may be, for example, a notebook computer, a desktop computer, an all-in-one system, a thin client, a workstation, a tablet computing device, a mobile phone, a printer, a scanner, or any other computing device suitable for execution of the functionality described below. In the embodiment of FIG. 1, client computing device 100 includes processor 110 and machine-readable storage medium 120.

As with processor 170 of server computing device 160, processor 110 may be one or more CPUs, microprocessors, and/or other hardware devices suitable for retrieval and execution of instructions. Processor 110 may fetch, decode, and execute instructions 122, 124, 126, 128 to generate a scannable form request, download a scannable form, and upload a scanned version of the form. Processor 110 may also or instead include electronic circuitry for performing the functionality of one or more instructions 122, 124, 126, 128. As with storage medium 180 of server computing device 160, machine-readable storage medium 120 may be any physical storage device that stores executable instructions.

Scannable form request generating instructions 122 may generate a request for a specific scannable form to be retrieved from server computing device 160. For example, a user may provide input to client computing device 100 using a user interface to request a scannable form. In response, scannable form request generating instructions 122 cause a scannable form request 142 to be generated. Scannable form request 142 may include an identification of the requested scannable form and an identification of the client computing device 100.

Communication is established between client computing device 100 and server computing device 160 before scannable form request 142 may be communicated to server computing device 160. For example, client computing device 100 may access server computing device 160 at a predetermined Uniform Resource Locator (URL) and, in response, server computing device 160 may establish a communication session with client computing device 100. In some implementations, client login credentials, such as a user identifier and a corresponding authentication parameter (e.g., a password), may be used to establish communication with server computing device 160. Upon successful authentication of the user of client computing device 100 to server computing device 160, scannable form request generating instructions 122 may then provide scannable form request 142 to server computing device 160 over network 140.

Scannable form request 142 is received at server computing device 160 using scannable form request receiving instructions 181. Scannable form request receiving instructions 181 parse data from scannable form request 142 to identify the specific form that is being requested. Scannable form generation instructions 182 may generate a scannable form 144 using the parsed data in addition to other data accessible to server computing device 140. The other data may be retrieved from local storage of server computing device 160 and from a remote storage device accessible to server computing device 160, such as a storage device 150 which is accessible to server computing device 160 via network 140.

In one example embodiment, scannable form 144 may be provided to client computing device 100 from server computing device 160 without scannable form request 142 being sent from client computing device 100 to server computing device 160. For example, server computing device 160 may be configured to provide scannable form 144 to client computing device 100 on a periodic basis. Such a configuration may be established as a subscription service, as discussed below.

Storage device 150 may be any hardware storage device for maintaining data accessible to server computing device 160. For example, storage device 150 may include one or more hard disk drives, solid state drives, tape drives, and/or any other storage devices. Storage device 150 may be located in server computing device 160 and/or in another device in communication with server computing device 160. As discussed in detail with reference to FIG. 6, storage device 150 includes database entries that associate unique identifiers 152 with corresponding actions 154 to be caused to occur in response to detecting the unique identifier on a scanned version of scannable form 144.

Scannable form generation instructions 182 may assign unique identifier 152 to scannable form 144. Unique identifier 152 allows for the identification of a specific scannable form. Unique identifier 152 may be provided on scannable form 144 as a bar code, a quick response (QR) code, or any other type of unique visual marker that may be readily scanned and identified.

Scannable form generation instructions 182 may identify which subsequent action 154 (or set of actions) is to be caused to occur when a scanned version of scannable form 144 is received. There are variety of different actions and groups of actions that may be caused to occur when the scanned version of scannable form 140 is received, as discussed below at least with reference to FIG. 6. Scannable form generation instructions 182 may identify the particular action 154 to be associated with unique identifier 152 from scannable form request 142 or by accessing a database of actions based on information provided in scannable form request 142. Database access instructions 184 may cause an identification of action 154 to be associated with unique identifier 152 in a database in storage device 150. After scannable form 144 is generated and unique identifier 152 is associated with action 154, scannable form transmitting instructions 186 may cause scannable form 144 to be transmitted to client computing device 100 over network 140.

Scannable form download instructions 124 may cause scannable form 144 to be downloaded from server computing device 160 to client computing device 100. In the event that client computing device 100 is a printer, scannable form download instructions 124 may cause scannable form 144 to be printed. In the event that client computing device 100 is not a printer, printer interaction instructions 126 may cause scannable form 144 to be output to a printer accessible to client computing device 100. The printed version of scannable form 144 includes unique identifier 152 and may include additional form data.

A user may provide additional data on scannable form 144. For example, the user may provide personal information (e.g., name, address, telephone number, etc.) on scannable form 144. Other examples of user-provided data may include a selection of items, responses to questions, test answers, or any information that the user desires to provide on scannable form 144. However, the user may not provide any information on scanned form 144. After scannable form 144 is printed, scannable form 144 is scanned to generate scanned form 146. As stated, scanned form 146 may be essentially identical to scannable form 144 or may include additional user-provided information. Uploading scanned form instructions 128 may cause scanned form 146 to be uploaded to server computing device 160 via network 140.

Upon receipt of scanned form 146 at server computing device 160, scanned form receiving instructions 188 may detect unique identifier 152 on scanned form 146. Unique identifier 152 may then be used by database access instructions 184 to access storage device 150 and identify action 154 that is associated with unique identifier 152. Further details regarding example database entries of unique identifiers and corresponding actions to be caused to occur are provided with reference to FIG. 6 and in the corresponding description below. Scanned form data processing instructions 189 may then cause action 154 corresponding to unique identifier 152 to occur.

The identification of the action may include location information sufficient to allow server computing device 160 to connect to another computing device. As one example, the location information may include an Internet Protocol (IP) address and a port of the other computing device for access by server computing device 160. In some implementations, the location information may further include configuration information, such as an identification of a communication protocol to be used by server computing device 160 in communicating with the other computing device (e.g., Citrix Independent Computing Architecture (ICA), Microsoft Remote Desktop Protocol (RDP), etc.) and settings for the identified protocol. In some cases, action 154 identifies multiple applications to be executed in response to receiving scanned form 146 at server computing device 160. Action 154 may also include information identifying a location of a specific server for each application, such as an IP address and a port number.

In one example embodiment, scannable form generation instructions 181 may cause a device identifier 156 to be stored with unique identifier 152 in storage device 150. Device identifier 156 may identify client computing device 100 or any other device that is authorized to print scannable form 144. Uploading scanned form instructions 128 may cause a device identifier associated with client computing device 100 to be provided to server computing device 160 along with scanned form 146. The device identifier may be used to provide a closed loop security model for enforcing that scanned form 146 is received at server computing device 160 from the device that printed scannable form 144 or from an authorized device. For example, if scanned form 146 is to cause an action to occur that is to be supported by additional authentication, uploading scanned form instructions 128 may provide to server computing device 160 the device identifier of the device that printed the scannable form 144. Scanned form receiving instructions 188 may then access storage device 150 using unique identifier 152 to ensure that the correct device identifier is received with scanned form 146 before processing continues.

In one illustrative example, a user may purchase a new computing device. As part of a registration process, the user's computer (e.g., client computing device 100) may submit a request for an introduction page to server computing device 160. In response, the introduction page is returned to client computing device 100 via network 140 and printed. The introduction page allows the user to configure device preferences by selecting specific items on the page. The page may then be scanned-back using the scanning capabilities of the printer. The printer detects unique identifier 152 on scanned form 146, and causes the data of scanned form 146 to be sent to server computing device 160. Server computing device 160 accesses a database in storage device 150 and identifies action 154 to be caused to occur that corresponds to unique identifier 152. In this example, action 154 may be sending the data of scanned form 146 to a configuration service associated with the new computing device. Accordingly, action 154 identifies the network location of the configuration service, and server computing device 160 forwards the data from scanned form 146 to the configuration service at the location identified in action 154. The configuration service may then access the user's computer via network 140 to perform any user-specific configuration that was indicated by the selections on scanned form 146.

Figure 2:
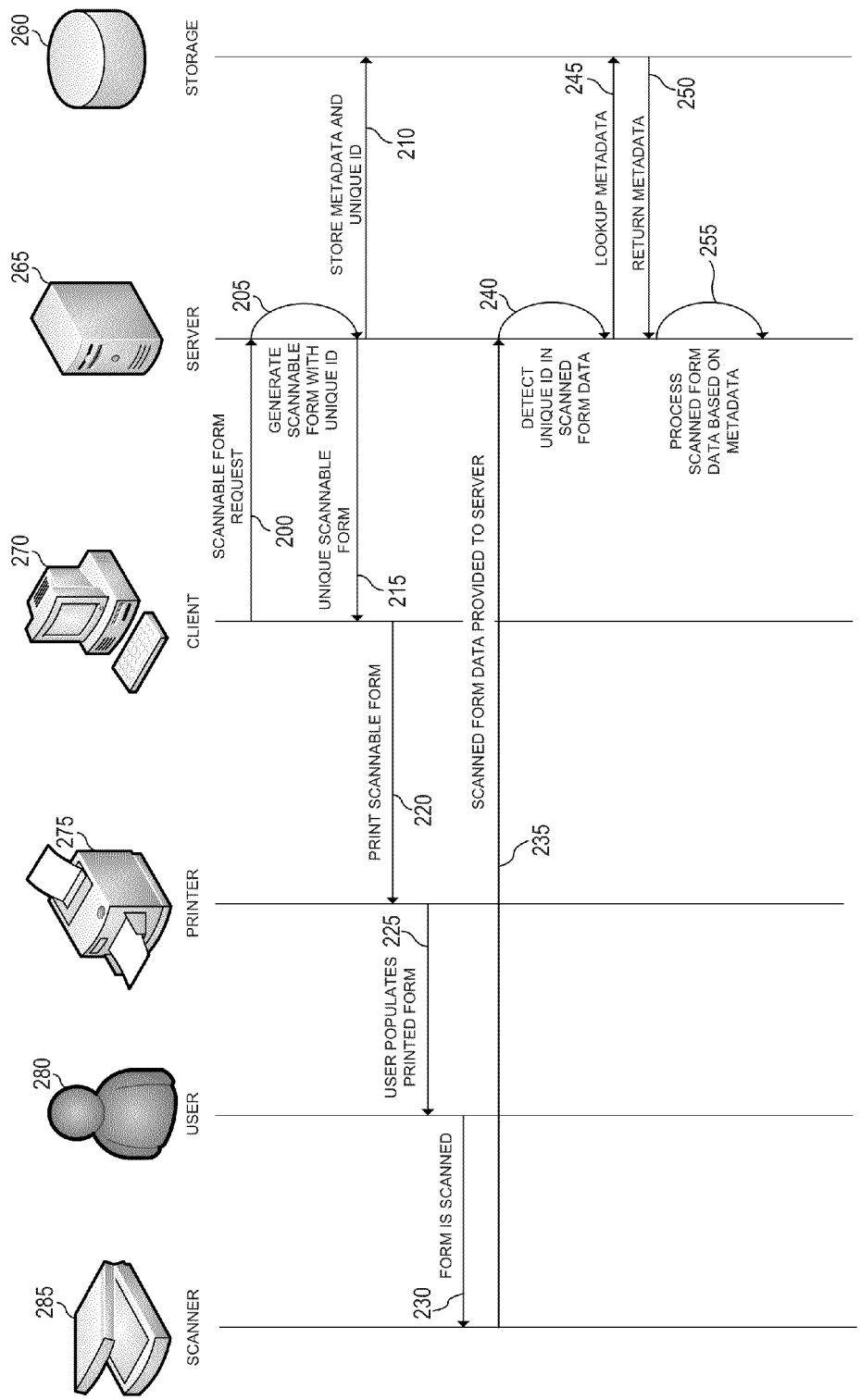
FIG. 2 is a timing diagram illustrating an example interaction between a client computing device, a server computing device, storage, a printer, a user, and a scanner.

FIG. 2 is a timing diagram illustrating an example interaction between a client 270, a server 265, storage 260, a printer 275, a user 280, and a scanner 285. As with client computing device 100 of FIG. 1, client 270 may be a notebook, desktop, tablet, workstation, mobile device, or any other device suitable for executing the functionality described below. It is understood that client 270, printer 275 and scanner 285 may be combined into a single computing device, for example, a printer with scanning capabilities that is accessible by server 265 over a network. As with server computing device 160 of FIG. 1, server 265 may be any server accessible to client 270 over a network that is suitable for executing the functionality described below.

The timing diagram of FIG. 2 will be described with reference to an education service that provides math worksheets to students. The process begins at step 200 where a user at client 270 requests a scannable form from server 265. The scannable form request may be submitted to server 265 when the user registers to receive daily math worksheets from the education service. Each worksheet may contain shapes, such as bubbles, to be filled-in by a student next to an answer.

In response to receiving the request, at step 205, server 265 generates a scannable form with a unique identifier. In this case, the user may have registered to receive a worksheet every school day. Accordingly, server 265 generates a worksheet each day that school is in session. In this case, the worksheet is generated without receiving the scannable form request from the client 270 since the user has registered to receive the worksheets on a periodic basis. The identifier is unique to each specific scannable form such that no two scannable forms are provided with the same identifier.

Upon assigning the unique identifier to the scannable form, in step 210, server 265 stores the unique identifier in a database in storage 260 with corresponding metadata. The metadata stored with the unique identifier identifies an action to be caused to occur in response to a subsequent detection of the unique identifier on a scanned version of the scannable form.

In this case, the metadata may identify the user that received the worksheet and the specific education service to which the user has registered including the network location of the education service.

After associating the unique identifier and the corresponding metadata, in step 215, the scannable form that includes the unique identifier is provided from server 265 to client 270 in response to the scannable form request. The user may access the scannable form at client 270 and elect, at step 220, to print out the scannable form. It is noted that step 215 and step 220 may be combined since it is understood that server 265 may provide the scannable form directly to printer 275 bypassing client 270.

User 280 may then populate the scannable form with data, at step 225. In this case, user 280 may provide personal information for identification purposes and may also select answers to math problems by filling-in shapes, such as bubbles, on the worksheet. In one example embodiment, user 280 populates the scannable form by writing on the scannable form. Alternatively, user 280 may select to populate the scannable form using client 270 and before printing the scannable form such that step 225 is performed before step 220. Accordingly, the populated scannable form may be printed at printer 275 such that the user need not manually write on the scannable form.

The populated form may then be scanned at scanner 285 at step 230. It is understood that printer 275 may also have scanning capabilities such that a separate scanner is not required. Upon completion of providing answers to math problems on the worksheet, user 280 may scan the populated worksheet. Scanner 285 (or printer 275) may detect the unique identifier on the scanned form. In response to detecting the unique identifier, the scanner 285 (or printer 275) may prompt user 280 to select either normal scan mode or scan-back processing mode. If user selects scan-back processing mode, the scanned data from the form is provided from scanner 285 (or printer 275) to server 265 at step 235.

Server 265 detects, at step 240, the unique identifier in the scanned form data received from scanner 285 (or printer 275). The detected identifier allows server 265 to identify the form as the same worksheet that was previously sent to user 280. In step 245, server 260 uses the unique identifier to access the corresponding metadata in the database in storage 260. As stated, the metadata associated with the unique identifier in the database identifies an action or set of actions to be taken in response to detection of the unique identifier in the scanned form data. In this case, the metadata may identify the education service and its network location (e.g., URL). The metadata is then returned to server 265 at step 250.

The scanned form data may then be processed at step 255 by causing the action described by the metadata to occur. The scanned form data may be processed by, for example, providing data from the scanned worksheet to the education service. The worksheet may then be scored at the education service and the student's score may be returned to client 270 (or printer 275). Alternatively, the worksheet may be merely recorded at the education service as having been completed by the student without returning any data.

Since each scanned form is associated with its own unique identifier, different identifiers may cause different actions to occur even though the scanned forms are essentially the same and correspond to the same service. For example, one user may submit a scanned form that includes a unique identifier that indicates that the worksheet is being used in a first grade class. Accordingly, a first grade set of problems would be returned to the user in response to receiving the scanned form. A different user may submit a scanned form that includes a unique identifier that indicates that the worksheet is being used in a sixth grade class. Accordingly, a sixth grade set of problems would be returned to the user in response to receiving the scanned form.

In some cases, step 225 may be omitted such that the user does not populate the scannable form with any information. In this case, user 280 may print out a worksheet. Without providing any information on the worksheet, the worksheet may be scanned-back to server 265 resulting in an answer sheet corresponding to the worksheet being returned to printer 275. Here, the unique identifier of the worksheet is associated with metadata in a database accessed by server 265. The corresponding metadata indicates that an answer sheet is to be printed in response to receiving the unique identifier on a scanned version of the worksheet without taking into consideration any user-provided information on the worksheet.

In the event that server 265 does not detect any user-provided data on the scannable form, server 265 may prompt user 280 to confirm that the scannable form is being provided with no additional data. For example, the action associated with the unique identifier may cause a sheet to be printed at printer 275 informing user 280 that no additional data was provided on the scannable form. In response to user confirmation, server 265 may process the scanned form by executing other actions associated with the unique identifier.

Figure 3:
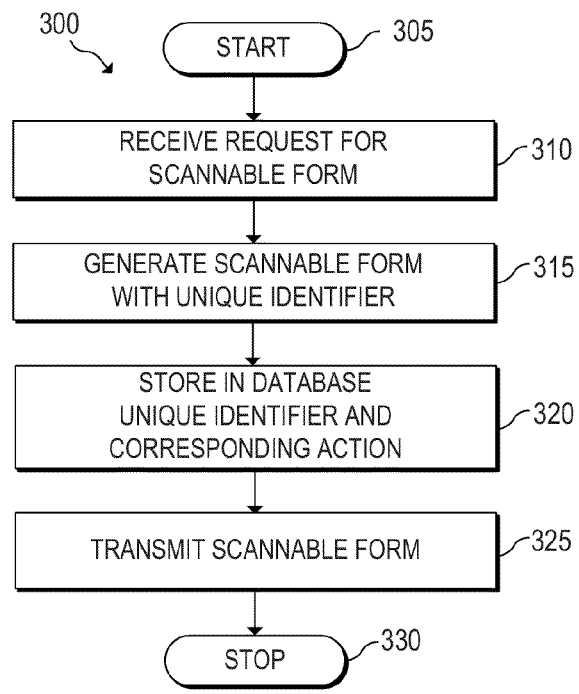
FIG. 3 is a flowchart of an example method for execution by a server computing device for generating a scannable form with a unique identifier.

FIG. 3 is a flowchart of an example method 300 for execution by server computing device 160 for generating a scannable form with a unique identifier. Although execution of method 300 is described below with reference to server computing device 160 of FIG. 1, other suitable devices for execution of method 300 will be apparent to those of skill in the art. Method 300 may be implemented in the form of executable instructions stored on a machine-readable storage medium, such as storage medium 180, and/or in the form of electronic circuitry.

Method 300 may start in block 305 and continue to block 310, where server computing device 160 may receive a request for a scannable form from client computing device 100. The requested form may be interactive such that a user may provide additional information on the form after the scannable form is returned to client computing device 100.

Next, in block 315, server computing device 160 may generate the scannable form with a unique identifier. The scannable form may be generated by server computing device 160 retrieving data from local and/or remote storage and populating the scannable form with the retrieved data. The unique identifier may be any unique visual indicator that can be scanned and interpreted as identifying the specific scannable form on which the unique identifier is provided. The unique identifier may be provided anywhere on the scannable form. Examples of unique identifiers include a bar code and a quick response (QR) code. Accordingly, limited space is occupied by the unique identifier on the scannable form.

In block 320, the unique identifier is stored in a database along with an identification of a corresponding action to be taken when the unique identifier is detected on a scanned version of the scannable form. The identification of the action to be taken may include, for example, the name and location of a particular application (or applications) to be executed when the unique identifier is detected. Another example of an identification of an action to be taken may be log-in credentials to be used to access a restricted network location. Other information that may be stored in the database with the unique identifier may include an identification of the user that requested the scannable form, and of the user's device from which the scannable form request was received.

Finally, in block 325, server computing device 160 may then provide client computing device 100 with the scannable form. The scannable form that is provided to client computing device 100 is unique to the requesting user since the identifier is different for every form even though each form may be essentially identical in every other way. In other words, no two scannable forms have the same identifier, even in the case where the same user requests two copies of the same scannable form. Method 300 may subsequently proceed to block 330, where method 300 may stop.

Figure 4:
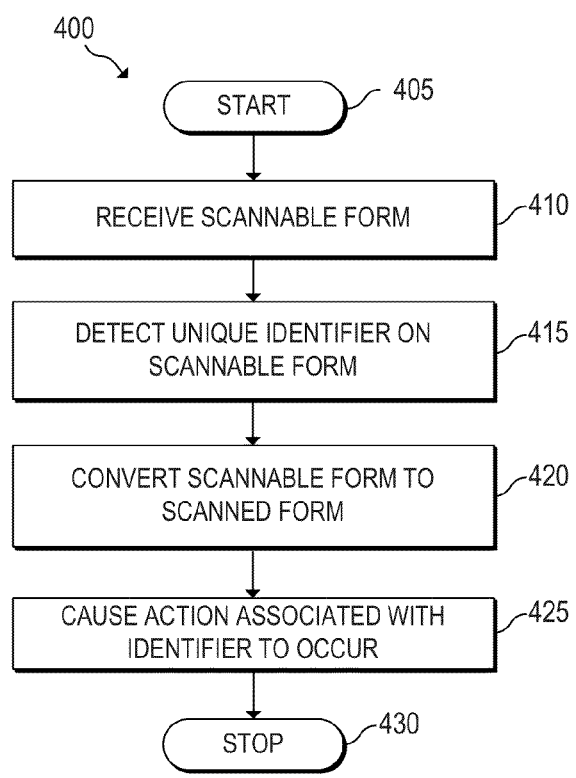
FIG. 4 is a flowchart of an example method for execution by a client computing device for processing a scannable form.

FIG. 4 is a flowchart of an example method 400 for execution by client computing device 100 for processing a scannable form. Although execution of method 400 is described below with reference to client computing device 100 of FIG. 1, other suitable devices for execution of method 400 will be apparent to those of skill in the art. Method 400 may be implemented in the form of executable instructions stored on a machine-readable storage medium, such as storage medium 180, and/or in the form of electronic circuitry.

Method 400 may start in block 405 and continue to block 410, where client computing device 100 receives a scannable form. The scannable form may be provided to client computing device 100 by a user. The scannable form may include an identifier that uniquely identifies the scannable form. The scannable form may include additional data provided by the user. Alternatively, the scannable form may not include any additional information such that the scannable form provided to client computing device 100 by user is essentially the same as the scannable form previously transmitted to client computing device 100 by server computing device 160.

Next, in block 415, client computing device 100 detects the identifier on the scannable form. The identifier may be associated with an action caused to be performed by client computing device 100. An example of such an action may include transmitting a scanned version of the form to server computing device 160.

In block 420, client computing device 100 converts the scannable form to a scanned form. In one example embodiment, the conversion is performed in response to receiving user selection of a normal scan mode or a scan-back mode. In the normal scan mode, the scannable form is converted to the scanned form, and the scanned form may be stored locally at client computing device 100 for additional processing by client computing device 100. In the scan-back mode, the scannable form is converted to the scanned form, and the scanned form may be prepared for transmission to server client computing device 160.

Finally, in block 425, client server device 100 may cause the action to occur by, for example, transmitting the scanned form to server computing device 160 for additional processing. Method 400 may subsequently proceed to block 430, where method 400 may stop.

Figure 5:
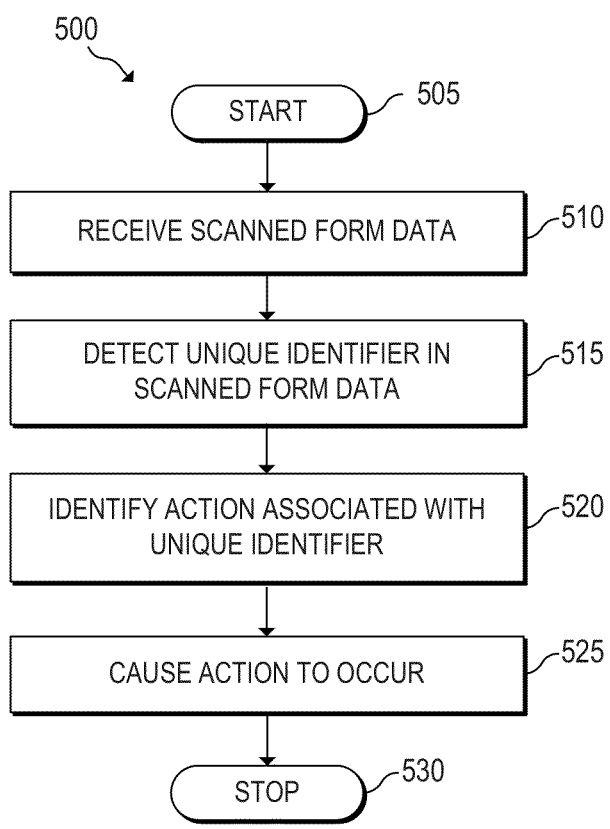
FIG. 5 is a flowchart of an example method for execution by a server computing device for processing scanned data received from a client computing device.

FIG. 5 is a flowchart of an example method 500 for execution by server computing device 160 for processing scanned form data. Although execution of method 500 is described below with reference to server computing device 160 of FIG. 1, other suitable devices for execution of method 500 will be apparent to those of skill in the art. Method 500 may be implemented in the form of executable instructions stored on a machine-readable storage medium, such as storage medium 180, and/or in the form of electronic circuitry.

Method 500 may start in block 505 and proceed to block 510, where scanned form data is received at server computing device 160 from client computing device 100. The scanned form data is a scanned version of the scannable form that was previously provided to client computing device 100. The scanned form data may or may not include additional user-provided data that was not provided with the initially sent scannable form.

Next, in block 515, the unique identifier is detected in the scanned form data. Even though the identifier may be provided anywhere on the form, a process for detecting the unique identifier is commonly configured to search for the unique identifier in a specific location of the scanned form data. The identifier provides an accurate identification of the particular scannable form that was previously transmitted to client computing device 100. Accordingly, when the same identifier is detected in the scanned form data, the unique identifier may be used as a key to the database.

In block 520, in response to detecting the unique identifier in the scanned form data, the unique identifier may be used to access the database and identify the action to be caused to occur on the scanned form data. The database may be stored remotely from server computing device 160 such that the database is provided in storage that is accessible to server computing device 160 via network 140.

Finally, method 500 may continue to block 525, where server computing device 525 may cause the action identified in the database to occur. A variety of different actions may be caused to occur to process the scanned form data, as indicated below with reference to FIG. 6. Method 500 may subsequently proceed to block 530, where method 500 may stop.

Figure 6:
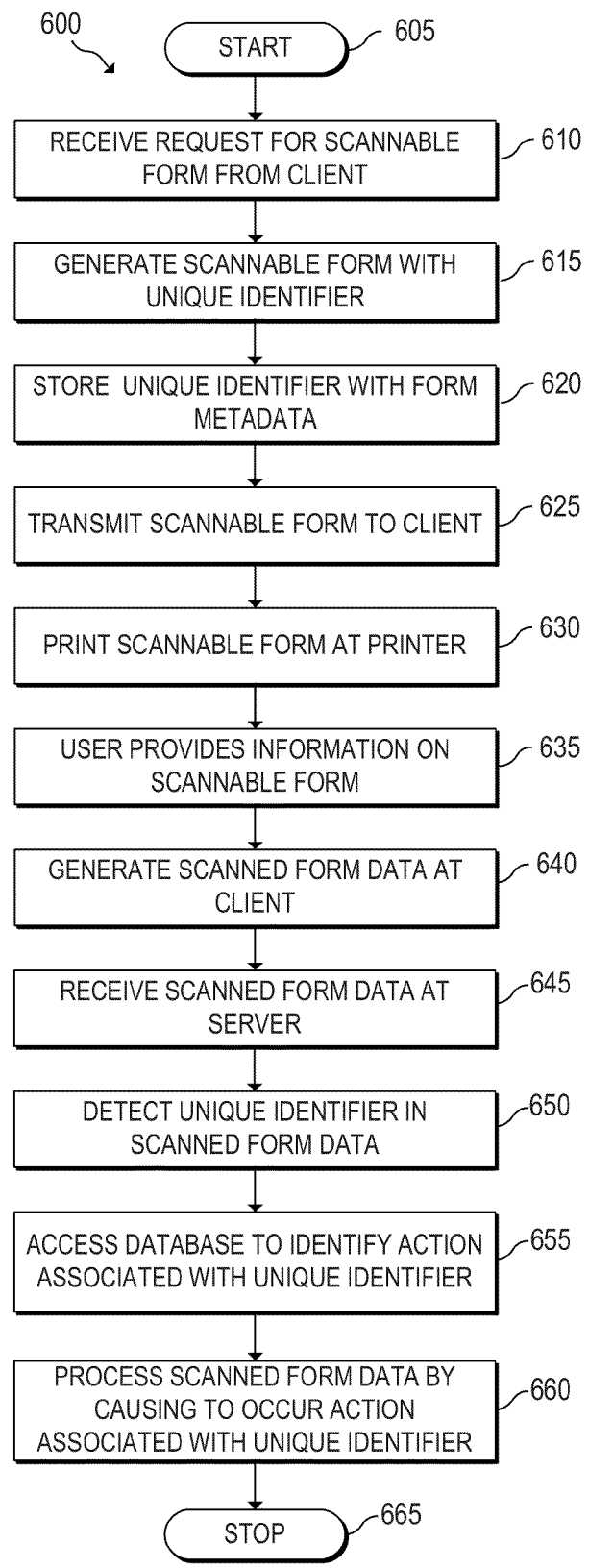
FIG. 6 is a flowchart of an example method for execution by a client computing device and a server computing device for generating a scannable form, and processing data on a scanned version of the form by executing an action associated with a unique identifier on the form.

FIG. 6 is a flowchart of an example method 600 for execution by server computing device 160 for generating a scannable form and processing data on a scanned version of the form. Although execution of method 600 is described below with reference to server computing device 160 of FIG. 1, other suitable devices for execution of method 600 will be apparent to those of skill in the art. Method 600 may be implemented in the form of executable instructions stored on a machine-readable storage medium and/or in the form of electronic circuitry.

Method 600 may start in block 605 and proceed to block 610, where server computing device 160 may receive a request for a scannable form from client computing device 100. In one example, a user may register for a document archive service. In this case, the user may submit a request for scannable forms from server computing device 160.

Next, in block 615, server computing device 160 may generate a scannable form with a unique identifier. For example, the scannable form request may include an indication of the document archive service such that server computing device 160 may access the service to determine a format of the requested scannable form. In particular, the document archive service may provide server computing device 160 with information that indicates that the scannable form should only be prepared with a unique identifier; no other information need be provided on the scannable form. The document archive service may also provide to server computing device 160 an indication of where on the scannable form the unique identifier should be located. In response, server computing device 160 may generate the scannable form based on the specifications provided by the document archive service.

In block 620, server computing device 160 may then store the unique identifier and corresponding form metadata in a database. The form metadata may include information about the scannable form such as the layout of the form. Accordingly, when the scannable form is scanned back to server computing device 160, server computing device 160 may access the metadata to determine where in the scanned form data to detect the unique identifier and other information provided on the scannable form by the user. The metadata may also identify the user and client computing device 100 (e.g., printer) from which the user requested the scannable form.

In block 625, server computing device 160 may transmit the scannable form to client computing device 100. For example, server computing device 160 may transmit to client computing device 100 a scannable form that includes only the unique identifier as set forth by the document archive service. In the event that the user requested more than one scannable form, each scannable form that is transmitted to client computing device 100 is provided with its own unique identifier. Server computing device 160 may also maintain a tally of the number of scannable forms requested by client computing device 100 and store this information for later reference.

In block 630, client computing device 100 may print the scannable form. If client computing device 100 is a printer, the scannable form is printed by the printer. In the event that client 100 is not a printer, client computing device 100 may print the scannable at a printer accessible by client computing device 100. When multiple scannable forms are requested by client computing device 100, each scannable form is printed with its unique identifier.

Next, in block 635, a user may provide information on the scannable form. The user may populate different portions of the scannable form to provide additional information on the form. The additional information may be subsequently detected by server computing device 160 to determine which action or actions are to be caused to occur when the form is scanned back. For example, the user may utilize the scannable form as pages for keeping a journal, attaching photos, recording recipes, drawing pictures, writing stories, etc. To differentiate document types, the user may provide an indication on each scannable form that identifies a particular category of the information provided on the scannable form. Such an indication may assist the document archive service in organizing the scanned-back forms for storage and subsequent retrieval.

In block 640, client computing device 100 may generate a scanned form by causing the scannable form to be scanned and transformed into scanned form data. The scannable form may be scanned using a scanner, a printer, a camera or any other device with scanning capability to generate scanned form data from the scannable form. The scanning device may detect the unique identifier in the scanned form data and, in response, may prompt the user to select normal scan mode or scan-back mode. The user may select scan-back mode to have the scanned form data provided to server computing device 160 for processing. The user may select normal scan mode to prevent the scanned form data from being automatically transmitted to server computing device 160. In this case, the unique identifier provided on the copy of the scannable form may include the metadata of the original unique identifier, but may also be altered to include an identification that the scannable form is a copy. In this way, each scannable form will retain a unique identifier. In block 645, server computing device 160 receives the scanned form data from client computing device 100.

In block 650, server computing device 160 may detect the unique identifier in the scanned form data. The additional information provided on the scannable form by the user may also be detected. After server computing device 160 detects the unique identifier, the metadata associated with the unique identifier may be accessed from the database. The metadata may include information about the layout of the scannable form such that server computing device 160 may be provided with data about the location of possible user-provided information in the scanned form data. For example, the metadata may indicate where on the form the user may have provided an indication of document type. Accordingly, server computing device 160 may readily access this information in the scanned form data and provide this data to the document archive service.

In an example embodiment, as stated above, server computing device 160 may maintain a tally of the number of times that a particular scannable form is requested by and transmitted to client computing device 100. Server computing device 160 may also maintain a tally of the number of scanned forms received from client computing device 100. For example, the document archive service may provide a bulk rate to users that submit more than one hundred pages per week for storage in the archive. In this case, server computing device 160 may maintain a tally of a number of scanned forms received from the user over a one week time period. In the event that the user submits more than one hundred scanned forms to server computing device 160 over the time period, server computing device 160 may provide this information to the document archive service such that the user's billing information may be updated accordingly. Server computing device 160 may also provide client computing device 100 with an indication that the threshold number of scanned forms has been surpassed and that a reduction in price has been applied. In some cases, the user may be instructed to perform some action in response to exceeding the threshold of the number of submitted scanned forms, such as downloading a promotional offer from the document archive service.

Next, in block 655, server computing device 160 accesses the database to retrieve the metadata associated with the unique identifier. As stated above, the metadata may indicate a layout of the scannable form. The metadata may also identify an action (or actions) to be caused to occur to process the scanned form data. The action(s) to be caused to occur may also be determined by the additional information provided on the scannable form by the user. For example, server computing device 160 may identify the document archival service from the metadata stored in the database and associated with the unique identifier. The metadata may also indicate locations in the scanned for data where user information may be provided. Accordingly, server computing device 160 may access any user-provided information in the scanned form data at these locations. In this case, the user-provided information may be an indication of document type (e.g., journal entry, photograph album insert, recipe, drawing, portion of a work of fiction, etc.). The user-provided information may be used in conjunction with the metadata retrieved from the database to identify a subsequent action (or actions) that server computing device 160 causes to occur.

Finally, in block 660, server computing device 160 processes the scanned form data by causing the action(s) to occur. With regard to the document archive service, server computing device 160 may forward the scanned form data to the service such that the scanned forms may be associated with the user, categorized according to document type, and stored for subsequent user retrieval. Method 500 may continue to block 665, where method 500 may stop.

FIG. 7 illustrates example database entries 700 that associate a unique identifier 710 on a form with a corresponding action 720 to be executed to process scanned form data. For simplicity of description, unique identifiers 710 are provided as A through J. However, it is understood that unique identifiers 710 may be any combination of numerals, letters or other characters to generate a unique string. It is also understood that the list of actions provided is not exhaustive and any number of additional actions may be caused to occur in response to receiving scanned form data. It is further understood that one unique identifier may be associated with more than one action such that multiple actions are caused to occur in response to detecting the corresponding unique identifier in the scanned form data.

Unique identifier A corresponds to an action that sends user-selected items on the scanned form to a printer. For example, a user may select a number of journalistic articles on the scannable form. When the scanned form data is processed, the selected articles may be output to the user's printer.

Unique identifier B corresponds to an action that adds or updates a user's personal or demographic information. The user may provide user-specific information on the scannable form such as the user's address or birthdate. The user may also provide demographic information such as consumer preferences on the scannable form. This information may be returned to server computing device 160 as scanned form data for storage and subsequent retrieval.

Unique identifier C corresponds to an action that causes an email or a text message to be automatically sent in response to server computing device 160 receiving the scanned form data. For example, a user may scan-back the form and server computing device 160 may cause an email or text message to be returned to the user indicating confirmation of receipt of the scanned form data.

Unique identifier D corresponds to an action that configures a computing device. The scannable form may provide a list of selectable features for a user to configure a particular computing device. In response to receiving the scanned form data, server computing device 160 may submit the selected features to a service provided by the manufacturer of the computing device. The service may then cause the user's computing device to be automatically configured in accordance with the selected features.

Unique identifier E corresponds to an action that transmits at least some of the scanned form data to a particular service. For example, the service may be a document archive service. The user may submit documents as scanned form data to server computing device 160. Server computing device 160 may then forward the documents to the documents archive service for storage and subsequent retrieval.

Unique identifier F corresponds to an action that automatically dials a phone number. For example, a user may submit to server computing device 160 scanned form data that includes information for ordering a product. In response, a service may cause an automated phone call to be made to the user to confirm that the product has been ordered.

Unique identifier G corresponds to an action that calculates a test score in response to receiving a user's scannable test form as scanned form data. In this case, a test result may be provided to client computing device 100 soon after scanning-back the form.

Unique identifier H corresponds to an action that provides a document specific to the user or an answer sheet to the user's printer in response to receiving the scanned form data. For example, different students in a school may submit the same form to server computing device 160. Since the student may be associated with the unique identifier in the database, server computing device 160 may identify the student and the student's grade level such that a user-specific document may be provided to each student in accordance with that user's grade level. Similarly, server computing device 160 may return an answer sheet to a test to the user in response to receiving a copy of the test as scanned form data. Here, it is noted that the user need not actually provide any information on the scannable form since the student's identity may be known and associated with the unique identifier in the database.

Unique identifier I corresponds to an action that causes the form to be recorded as received at server computing device 160. Server computing device 160 may be configured to maintain a tally of a number of particular forms that are scanned-back. For example, a service may indicate that a reward is to be provided to the first one hundred customers who respond to an offer. Accordingly, server computing device 160 may count the first one hundred received scanned-back forms and then prevent the receipt of any additional forms.

Unique identifier J corresponds to an action that subscribes the user to a service. For example, a user may indicate a desire to subscribe to a periodical on the scannable form. In response to receiving the scanned form data, server computing device 160 may forward the user's information to a periodical service such that the user may begin receiving copies of the periodical in the mail.

The foregoing disclosure describes a number of example embodiments for generating a scannable form and processing a scanned version of the scannable form. In this manner, the embodiments disclosed herein enable automatic execution of an action in response to receiving scanned form data.

We claim:

1. A method comprising:
   receiving, at a server computing device, a request for a scannable form from a client computing device;
   in response to receiving the request, generating the scannable form at the server computing device, the scannable form including an identifier that identifies the scannable form;
   transmitting the scannable form to the client computing device;
   receiving, at the server computing device, a scanned form, corresponding to the scannable form, transmitted from the client computing device, the scanned form including input data;
   detecting, at the server computing device, the identifier on the scanned form;
   accessing a database based on the identifier to determine one of a catalog service, a subscription service, a configuration service, an education service, or a document archive service, associated with the scanned form, to process the input data of the scanned form; and
   transmitting the scanned form to the determined service for processing.

2. The method of claim 1, wherein the database associates each of a plurality of identifiers with a corresponding one of the catalog service, the subscription service, the configuration service, the education service, or the document archive service.

3. The method of claim 1, further comprising:
   accessing the database based on the identifier to determine a set of actions to process the input data of the scanned form;
   wherein determining the one of the catalog service, the subscription service, the configuration service, the education service, or the document archive service is further based on the set of actions.

4. The method of claim 1, wherein the one of the catalog service, the subscription service, the configuration service, the education service, or the document archive service is determined based on the identifier and content of the scanned form.

5. The method of claim 1, wherein the scanned form corresponds to a form filled out and scanned by a user of the client computing device.

6. The method of claim 1, wherein:
the database includes a device identifier that identifies the client computing device from which the scanned form is received; and
prior to transmitting the scanned form to the associated application service, the server computing device is to verify that the client computing device is associated with the device identifier in the database.

7. The method of claim 1, wherein the determined one of the catalog service, the subscription service, the configuration service, the education service, or the document archive service is to perform at least one of: printing items selected on the scanned form, adding personal information, updating personal information, adding demographic information, updating demographic information, sending an email message, sending a text message, configuring a computing device, transmitting scanned form data to a service, dialing a telephone number, calculating a score, printing a document associated with the scanned form, printing a document associated with a user, recording the scanned form as received, storing scanned form data, and subscribing a user to a service.

8. The method of claim 1, wherein the scanned form comprises the scannable form and the input data.

9. The method of claim 1, wherein the input data is provided on the scannable form by a user.

10. A non-transitory machine-readable storage medium storing instructions that, when executed by a processor of a server computing device, cause the server computing device to perform operations comprising:
receiving, from a client computing device, a request for a scannable form;
in response to receiving the request, generating the scannable form comprising the identifier;
correlating, in a storage accessible by the server computing device, the identifier and one of a catalog service, a subscription service, a configuration service, an education service, or a document archive service to process input data to be inputted by a user of a client computing device onto the scannable form;
transmitting the scannable form to the client computing device;
receiving a scanned form associated with the scannable form, the scanned form comprising the scannable form and the input data;
detecting the identifier on the scanned form;
accessing the storage to determine, based on the identifier, the one of the catalog service, the subscription service, the configuration service, the education service, or the document archive service to process the input data of the scanned form; and
transmitting the scanned form to the determined service for processing.

11. The non-transitory machine-readable storage medium of claim 10, wherein the instructions, when executed by the processor, cause the server computing device to perform further operations comprising:
accessing the storage based on the identifier to determine a set of actions to process the input data associated with the scanned form;
wherein determining the one of the catalog service, the subscription service, the configuration service, the education service, or the document archive service is further based on the set of actions.

12. A computing device comprising:
one or more processors; and
one or more memory resources storing instructions that, when executed by the one or more processors, cause the one or more processors to:
receive a request for a scannable form from a client computing device;
in response to receiving the request, generate the scannable form, the scannable form including an identifier that identifies the scannable form;
transmit the scannable form to the client computing device;
receiving a scanned form, corresponding to the scannable form, transmitted from the client computing device, the scanned form including input data;
detecting the identifier on the scanned form;
accessing a database based on the identifier to determine one of a catalog service, a subscription service, a configuration service, an education service, or a document archive service, associated with the scanned form, to process the input data of the scanned form; and
transmitting the scanned form to the determined service for processing.

13. The computing device of claim 12, wherein the database associates each of a plurality of identifiers with a corresponding one of the catalog service, the subscription service, the configuration service, the education service, or the document archive service.

14. The computing device of claim 12, wherein the executed instructions further cause the one or more processors to:
access the database based on the identifier to determine a set of actions to process the input data of the scanned form;
wherein determining the one of the catalog service, the subscription service, the configuration service, the education service, or the document archive service is further based on the set of actions.

15. The computing device of claim 12, wherein the one of the catalog service, the subscription service, the configuration service, the education service, or the document archive service is determined based on the identifier and content of the scanned form.

* * * * *